(12) United States Patent  (10) Patent No.: US 7,585,001 B2
Rose  (45) Date of Patent: Sep. 8, 2009

(54) QUICK-DISCONNECT LATCH FOR FLUID CONDUITS

(75) Inventor: Joseph L. Rose, Pembroke (CA)

(73) Assignee: Flight Suits, El Cajon, CA (US)

( * ) Notice: Subject to any disclaimer, the term of this patent is extended or adjusted under 35 U.S.C. 154(b) by 640 days.

(21) Appl. No.: 11/369,290

(22) Filed: Mar. 6, 2006

(65) Prior Publication Data

US 2008/0012315 A1   Jan. 17, 2008

(51) Int. Cl.
*F16L 39/00* (2006.01)
*F16B 21/00* (2006.01)

(52) U.S. Cl. .................. 285/317; 285/305; 285/316; 403/329

(58) Field of Classification Search .......... 403/321, 403/325, 327, 328, 329, 330; 411/24, 347, 411/348, 549, 550, 551, 552, 553; 292/8, 292/41, 137, 146, 150, 163, 175, 302; 285/95, 285/305, 316, 317; 24/453, 613
See application file for complete search history.

(56) References Cited

U.S. PATENT DOCUMENTS

| 0,464,386 | A |   | 12/1891 | Patterson |   |
|---|---|---|---|---|---|
| 1,150,420 | A |   | 8/1915 | Davis |   |
| 2,099,335 | A |   | 11/1937 | Hansen |   |
| 2,241,609 | A | * | 5/1941 | McClelland et al. | 269/48.4 |
| 2,317,315 | A | * | 4/1943 | Wallace | 269/48.4 |
| 2,439,531 | A | * | 4/1948 | Wallace | 269/48.4 |
| 2,722,399 | A |   | 11/1955 | Oetiker |   |
| 3,081,122 | A | * | 3/1963 | Jungersen | 294/82.32 |
| 3,132,667 | A |   | 5/1964 | Baker et al. |   |
| 3,279,827 | A |   | 10/1966 | Brown |   |
| 4,086,939 | A |   | 5/1978 | Wilcox et al. |   |
| 4,195,865 | A |   | 4/1980 | Martin |   |
| 4,413,846 | A |   | 11/1983 | Oetiker |   |
| 4,801,232 | A | * | 1/1989 | Hempel | 411/552 |
| 4,863,201 | A |   | 9/1989 | Carstens |   |
| 4,936,161 | A | * | 6/1990 | Polando | 74/502.6 |
| 4,971,096 | A |   | 11/1990 | Perrine |   |
| 5,042,787 | A | * | 8/1991 | Duffaud | 269/48.4 |
| 5,044,921 | A | * | 9/1991 | Micelli et al. | 425/451.9 |
| 5,199,733 | A | * | 4/1993 | DeLorme | 280/515 |
| 5,240,361 | A | * | 8/1993 | Armstrong et al. | 269/48.2 |
| 5,265,182 | A | * | 11/1993 | Hartley | 385/77 |
| 5,464,042 | A |   | 11/1995 | Haunhorst |   |
| 5,722,806 | A | * | 3/1998 | Erickson et al. | 409/233 |
| 5,795,093 | A | * | 8/1998 | Seaton et al. | 403/322.1 |

(Continued)

*Primary Examiner*—James M. Hewitt
*Assistant Examiner*—Jay R Ripley
(74) *Attorney, Agent, or Firm*—Procopio, Cory, Hargreaves & Savitch, LLP

(57) ABSTRACT

A quick disconnect latching device for use in a liquid conduit coupling has two halves: a pin half and a release half. The pin half includes a casing sleeve into which a latch pin is slidably retained. The latch pin is spring biased into a retracted position within the sleeve. Latch pin dogs are located at the ends of arms extending from the latch pin to interact with a catch within the release half. A hollow nose casing is tapered to cam the arms inward when a sufficient separating axial force is applied to one or both of the pin half and the release half, so that the latch pin dogs release the catch. The amount of force required to separate the latch halves can be adjusted by varying the spring bias using an adjustment screw.

20 Claims, 7 Drawing Sheets

U.S. PATENT DOCUMENTS

| | | | |
|---|---|---|---|
| 5,845,943 A | 12/1998 | Ramacier | |
| RE36,351 E * | 10/1999 | Yamamoto et al. | 280/728.2 |
| 6,126,115 A * | 10/2000 | Carrier et al. | 244/173.3 |
| 6,302,147 B1 | 10/2001 | Rose et al. | |
| 6,547,284 B2 | 4/2003 | Rose et al. | |
| 7,048,266 B2 * | 5/2006 | Starr | 269/25 |
| 7,267,379 B2 * | 9/2007 | Rusiana | 292/332 |
| 2006/0202444 A1 * | 9/2006 | Rudduck et al. | 280/728.2 |

* cited by examiner

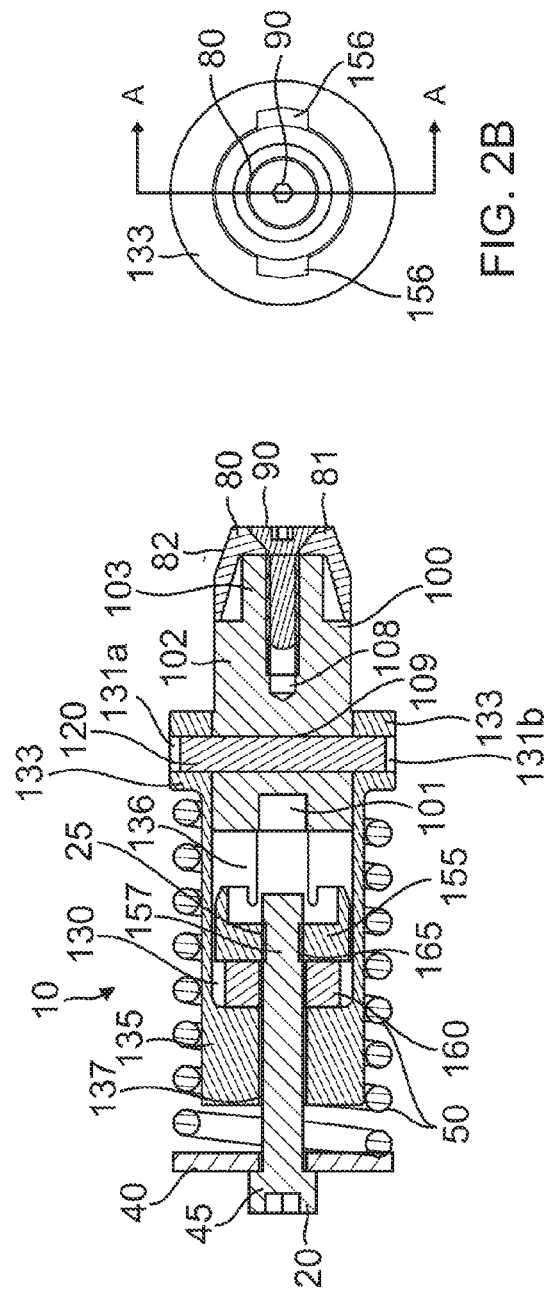
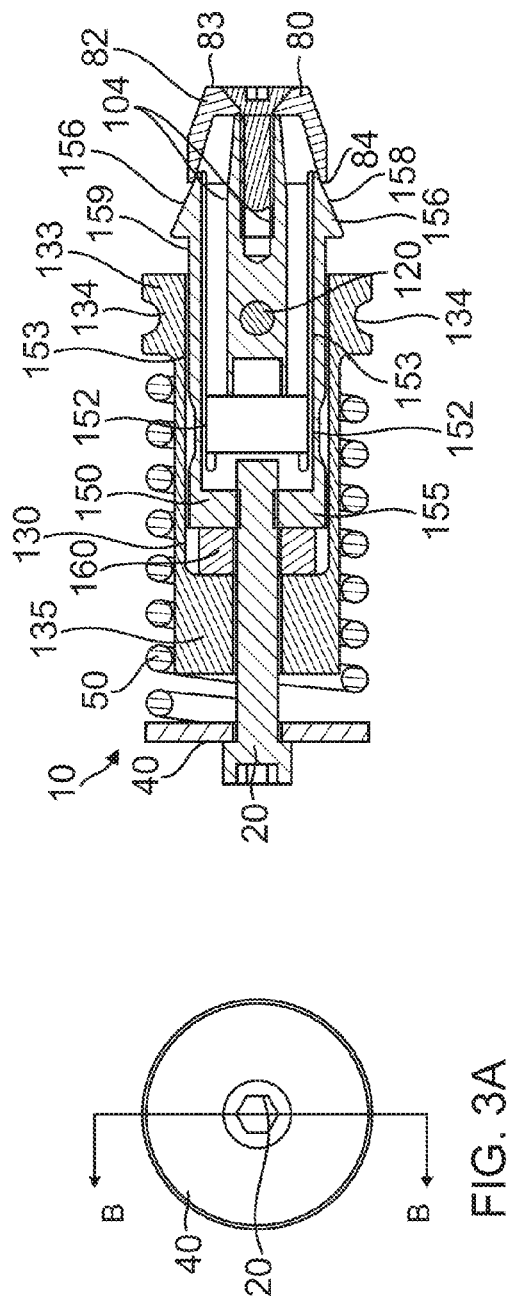

QUICK-DISCONNECT LATCH FOR FLUID CONDUITS

FIELD OF THE INVENTION

The present invention relates to a fluid conduit coupling device that automatically uncouples with the application of a predetermined and adjustable break force.

BACKGROUND OF THE INVENTION

Uniforms and protective clothing, often referred to as PPE (Personal Protective Equipment), worn by military, rescue and maintenance personnel sometimes incorporate liquid cooling features to minimize the risk of overheating under extreme environmental conditions, for example, desert climates, fire, or high temperature industrial operations, or due to weight, density or lack of breathability, such as explosion, hazardous material or radiation shielding. There are two basic cooling approaches, active and static, each having advantages and disadvantages. Static devices, such as ice vests, do not circulate any coolant, but work on convective heat transfer. They must be worn by the user to be effective. Active cooling systems have the advantage of controlled cooling rate with the cooling liquid supplied by almost any heat sink source. The circulation function in active devices is typically provided by a pump and reservoir in a vehicle or structure that the wearer plugs into by means of a connector that seals the liquid conduit to prevent loss of coolant or introduction of air or other contaminants into the conduit during connection and release. In situations where it becomes necessary to abruptly uncouple the fluid conduits, it is desirable to provide a means for rapidly automatically disconnecting the coupling without damaging the conduits or the coupling such that rapid re-coupling cannot occur without requiring repair. Further, the act of uncoupling, even when done suddenly, should occur without fluid leakage.

In general, all liquid connectors have seals to control liquid loss. Simple designs have outer seals that seal while the connectors are coupled but do not prevent flow when disconnected. More complex connectors used valves to reduce or eliminate flow when the connector components are separated. A number of detachable fluid conduit coupling systems are known in the prior art. Many such devices employ spring-loaded ball-type valves that may reduce the loss of process fluid upon uncoupling. Examples of such systems are described in U.S. Pat. No. 4,105,046 of Sturgis, and U.S. Pat. No. 5,092,364 of Mullins. Systems of this type fail to provide means for preventing the introduction of contaminants such as air and ambient fluids into the process fluid upon coupling.

All connectors require some form of releasable locking mechanism, usually a push button or other trigger to separate the connector halves. One of the more important components of fluid conduit couplings that are used for personnel cooling is an auto release that allows the connector to be separated without the user initiating any action. Such couplings typically have a break force designed to match specifications for the particular application.

Most fluid coupling systems of the prior art are not adapted to allow damage-free separation of the connector ends upon the application of tensile force when a manual release mechanism has not been actuated. This can result in the loss of significant quantities of process fluid due to conduit rupturing when emergency separation becomes necessary. In situations where the process fluid is potentially dangerous, release of the fluid can pose a substantial hazard.

U.S. Pat. No. 6,547,284, which is incorporated herein by reference, describes a fluid conduit coupling that allows quick connection and disconnection with substantially no introduction of ambient fluids or air into the process fluid. The latch can be disconnected by activation of a manual release or by the application of a predetermined tensile force, which is determined by spring specification. One disadvantage of this device is that the spring must exert exactly the same force for each connector set in order to provide repeatable performance. Due to inherent manufacturing variations, the springs used in this connector tend to vary in force from one to another. Further, for the required disconnect force to be uniform, the spring must exert the same amount of break force at each point in the circumferential axis. However, by their very design, single helix springs are incapable of exerting the same force around the entire circumferential axis, and mere rotation of the spring, which occurs normally in this design, will produce a difference in force. In addition, the latching surfaces, with a single contact point, are located a distance from the fulcrum for latching such that the surface finish of the parts becomes critical to the amount of force required for delatching. Any change in the surface finish amplifies a change in the break force. Further, due to the use of a single contact point, an abrupt force applied perpendicular to the connector axis will cause the coupling to delatch. An additional disadvantage is that there is no means provided for adjusting the break force.

Accordingly, the need remains for a quick-disconnect connector for fluid conduits that will automatically and reliably disengage upon application of a predetermined break force that can be adjusted by the user to meet the application The present invention is directed to such a connector.

BRIEF SUMMARY OF THE INVENTION

It is an advantage of the present invention to provide a latch for a liquid conduit connector that allows for a quick connection and quick disconnection of the two halves of the connector where the required break force for disconnection is adjustable.

It is another advantage of the present invention to provide a latch for a quick release liquid conduit connector that minimizes the effects on repeatable performance that may be caused by variations in manufacture and materials.

A further advantage of the present invention is to provide a latch for a quick disconnect connector that eliminates the risk of unintentional disengagement of the two sides by an inadvertent external forces.

The quick-release connector of the present invention has two halves: a pin connector and a release connector. The pin connector includes a casing sleeve into which a latch pin is slidably retained. The latch pin is spring biased into a retracted position within the sleeve. Latch pin dogs are located at the ends of arms extending from the latch pin to interact with a catch within the release connector. A hollow nose casing is tapered to cam the arms inward when a sufficient separating axial force is applied to one or both of the pin connector and the release connector, so that the latch pin dogs release the catch. The amount of force required to separate the connector halves can be adjusted by varying the spring bias using an adjustment screw.

In an exemplary embodiment, the inventive quick-disconnect latch for fluid conduit connections has two halves: a pin connector and a release connector. The pin connector includes a casing sleeve having a sleeve base and a first spring flange; a latch pin is slidably disposed at least partially within the casing sleeve and includes a latch pin base and at least two latch arms extending from the base, where each latch arm has a latch pin dog extending radially away from the axial centerline of the pin. A bias spring is disposed around the casing sleeve with one end abutting the first spring flange to bias the latch pin toward the sleeve base. A screw extends axially through the sleeve base, where the screw has a head end for retaining a second spring flange and a threaded end for mating with a threaded bore formed in the latch pin base. A pin casing assembly includes a nose casing with a tapered cavity and a cylindrical base with a distal extension extending into the tapered cavity. The cylindrical base and distal extension each have channels for slidably receiving the latch arms, where the latch arms extend at least partially into the tapered cavity, and where the pin casing assembly is attached to the casing sleeve so that the latch pin slides axially relative to the pin casing assembly. The release connector includes a release housing with a release catch for cooperating with the latch pin dogs to engage the release connector and the pin connector. Adjustment of the screw controls compression of the bias spring to adjust bias force applied by the spring to establish a predetermined axial break force so that the pin connector is separable from the release connector by applying axially separating forces that exceed the pre-determined axial break force.

In a preferred embodiment, the release connector includes a manual release mechanism including a release trigger disposed within the release housing and having a first camming surface. A release slide slides within the release housing and has a second camming surface for interacting with the first camming surface so that activation of the release trigger causes the release slide to move toward the pin connector, forcing the latch arms radially inward until the latch pin dogs lose contact with the release catch, releasing the pin connector from the release connector.

BRIEF DESCRIPTION OF THE DRAWINGS

The present invention will be more clearly understood from the following detailed description of the preferred embodiments of the invention and from the attached drawings, in which:

FIG. 2A is a cross sectional view of the pin half through section A-A of FIG. 2B, which shows an end view of the insertion (distal) end of the pin half of the latch assembly.

FIG. 3A is an end view of the proximal end of the pin half; FIG. 3B is a cross sectional view of the pin half through section B-B of FIG. 3A.

FIG. 9a shows the connector halves separate and aligned; FIG. 9b shows the connector engaged; FIG. 9c shows the application of initial outward force causing the latch pin dogs to begin to retract; FIG. 9d shows application of increased outward force, causing further retraction of the latch pin dogs; and FIG. 9e shows full retraction of the latch pin dogs to allow disengagement of the connector halves.

DETAILED DESCRIPTION OF THE PREFERRED EMBODIMENTS

As illustrated in FIGS. 1, 4, 9a-9e, and 10, the quick-disconnect latch assembly has two halves: a pin half 10 and a release half 300.

Figure 1:
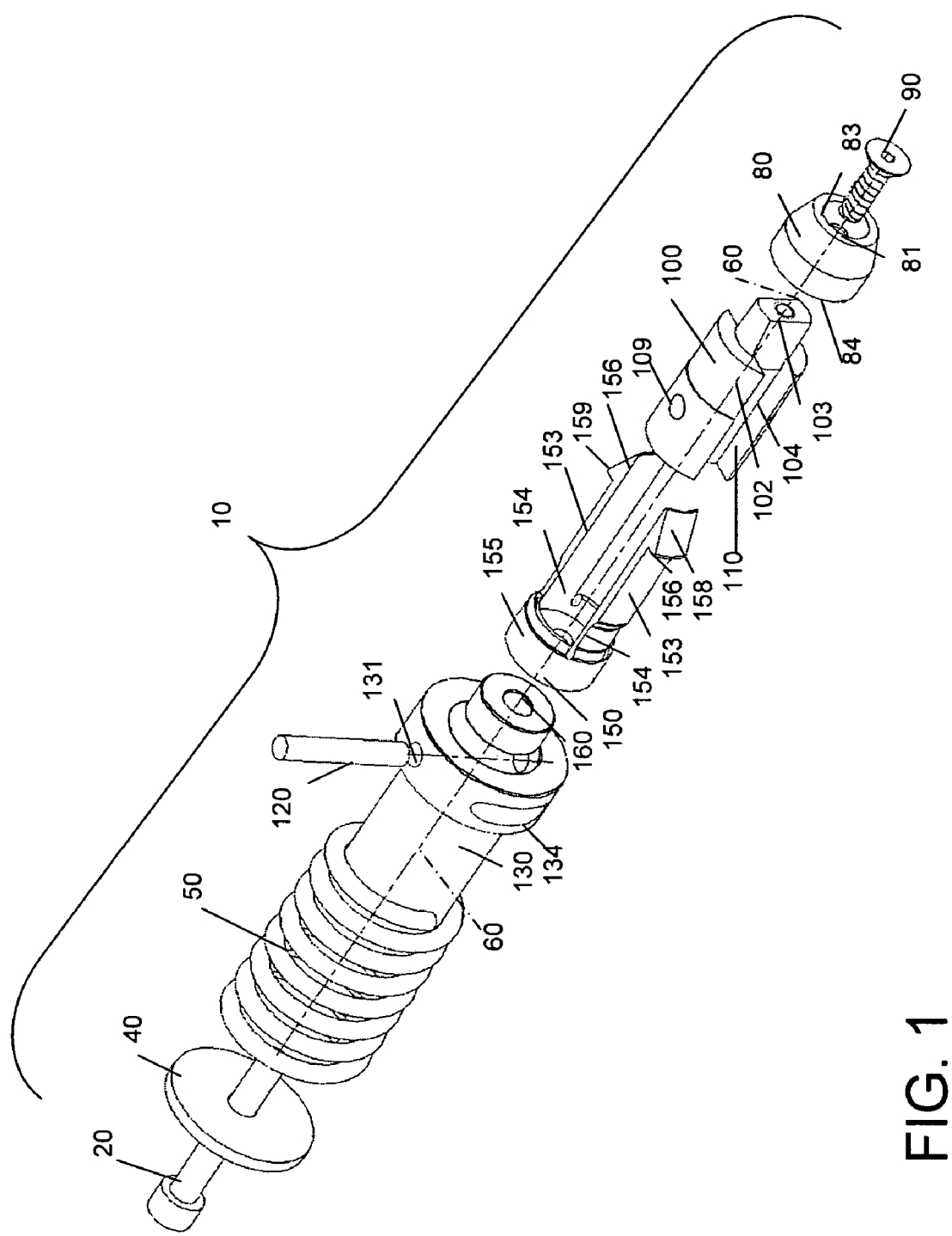
FIG. 1 is an exploded perspective view of the pin half of the latch assembly.

Referring to FIG. 1, pin half 10 is an assembly comprising a nose pin casing 80, a nose screw 90, a front pin casing 100, a solid dowel pin 120, a latch pin 150 with latch pin dogs 156, a pin casing sleeve 130, a bumper washer 160, a pin spring washer 40, a pin tension screw 20, and a latch pin spring 50. Release half 300, illustrated in FIGS. 4-6, comprises the following components: a release catch 310, a release slide 320, a release housing 330, a release wedge 340, a push button 350, and a push button spring 360.

As illustrated in FIGS. 2A and 3B, nose pin casing 80 has a distal end 83 and a proximal end 84 dimensioned to fit concentrically over distal end 103 of front pin casing 100. Nose pin casing 80 is generally cylindrical with distal end 83 tapered so that its exterior is generally frusto-conical. Distal end 83 has a bore 81 formed along its axial centerline 60 with a diameter adapted to receive a nose screw 90. Bore 81 is further countersunk so that the head of nose screw 90 fits flush with the flat end surface of nose pin casing 80. Proximal end 84 of casing 80 is hollow, forming a frusto-conical cavity having a first inner diameter near the distal end tapering to a larger, second inner diameter at its open end. The surface of the frusto-conical cavity defines a release surface 82 that interacts with latch pin dogs 156 to force dogs 156 radially inward when latch pin 150 is forced into nose pin casing 80. The outer diameter of distal end 83 of nose pin casing 80 is smaller than the inner diameters of release catch 310 and release slide 320 (shown in FIGS. 5 and 6), allowing release half 300 to be removed without nose pin casing 80 contacting release catch 310.

As illustrated in FIGS. 1, 2A and 3B, front pin casing 100 is generally cylindrical with a proximal section 102 and distal end extension 103. Two axially-extending channels 110 (seen in FIG. 1) are formed on diametrically opposite sides of front pin casing 100, with each channel 110 having a depth and a width dimensioned to slidably receive latch pin arms 153. Channels 110 are of sufficient depth that the distal ends of latch pin arms 153 will not touch the bottom of channels 110 during the release process. Distal end extension 103 has a diameter smaller than that of proximal section 102 so that it fits within the cavity of nose pin casing 80. Channels 104 extend the entire length of front pin casing 100, including extension 103, but increase in depth so that extension 103 tapers slightly axially inward. A bore 108 is formed in extension 103 along axial centerline 60 and is threaded to mate with nose screw 90 to secure nose pin casing 80 to front pin casing 100.

Bore 109 extends through proximal section 102 of front pin casing 100, perpendicular to axial centerline 60 and the planes defined by channels 110. When pin half 10 is assembled, front pin casing 100 is slidably received within pin casing sleeve 130 so that bore 109 is aligned with openings 131a and 131b in pin casing sleeve 100. As shown in FIG. 2A, a dowel pin 120 is inserted through opening 131a, through bore 109, and through opening 131b, securing front pin casing 100 to pin casing sleeve 130. A concentric recess 101 is formed in the base end of proximal section 102 and is dimensioned to allow distal end 25 of pin tension screw 20 to enter recess 101 without contacting proximal section 102 when the two sides of the latch are being pulled apart.

Still referring to FIGS. 1, 2A, 2B and 3B, latch pin 150 has a generally cylindrical base portion 155 with a pair of latch pin arms 153 extending away from the base portion toward the distal end of pin half 10. Latch pin 150 is preferably formed from metal, such as 17-4 stainless steel, however, other materials will be readily apparent to those of skill in the art and may include plastics and polymers. Base portion 155 is concentric with axial centerline 60. Threaded opening 157 is formed in the proximal end of latch pin base 155, centered along axial centerline 60. Two elongated latch pin arms 153 are disposed on diametrically opposite sides of axial centerline 60 and have a generally flattened inner surface that aligns with and slides axially within channels 110 of front pin casing 100. A latch pin dog 156 is formed in the distal end of each latch pin arm 153. Each latch pin dog 156 is wedge shaped with a tapered latch release surface 158 and a latching surface 159. Latching surface 159 is perpendicular to axial centerline 60 and latch release surface 158 tapers outward from the distal end of latch pin arm 153 toward latch surface 159. As shown in FIGS. 9a-9e, the distal end of each latch pin arm 153 penetrates into nose pin casing 80 to varying degrees during different stages of operation of the latch. The proximal end of each latch pin arm 153 has a notch 154 formed in its outer surface to generate a radially outward bias in the distal end of the arm, causing latch release surface 158 to be biased against release surface 82 of nose pin casing 80. During automatic disconnection operation, latch pin 150 is moved toward nose pin casing 80, causing latch pin dogs 156 to penetrate deeper into nose pin casing 80 where latch release surface 158 and release surface 82 cooperate to force the distal ends of latch pin arms 153 radially inward.

The outer diameter of latch pin base 155 is smaller that the inner diameter of pin casing sleeve 130, allowing latch pin base 155 to slidably fit within pin casing sleeve 130. The additional height provided by latch pin dogs 156 causes the distal end of the latch pin 150 to have an effective diameter that is larger than the inner diameter of pin casing sleeve 130 until the latch pin dogs are fully depressed.

Bumper washer 160 is disposed over pin tension screw 20 and within pin casing sleeve 130 between pin casing sleeve base 135 and latch pin base 155. Bumper washer 160 is preferably formed from an elastomer or other resilient material. Latch pin base 155 is biased against bumper washer 160 by spring 50 when pin half 10 is detached from release half 300. During the automatic release operation, when spring 50 is compressed, latch pin 150 moves away from bumper washer 160 until release occurs. Upon release, the spring tension causes pin 150 to resile, striking bumper washer 160, which dampens the impact.

Pin casing sleeve 130 is generally cylindrical with a base, a center, and a distal end. The pin casing base 135 is solid with a concentric bore 137 of sufficient diameter for the pin tension screw 20 to slidably penetrate pin casing base 135 to extend into the interior of sleeve 130. The center 136 of pin casing sleeve 130 has a cavity for receiving bumper washer 160, latch pin base 155, and proximal section 102 of front pin casing 100. The base 135 and the center 136 sections have the same outer diameter. The distal end has a flange 133 with a diameter larger than that of spring 50 to support the distal end of the spring. One or more recesses 134 may be formed in the outer edge of flange 133 to facilitate attachment within a casing, such as that shown in FIG. 7. Bores 131a and 131b extend radially through the flange 133 at diametrically opposite locations for insertion of dowel pin 120 into base 102 of the front pin casing.

Latch pin spring 50 fits over the outer surface of casing sleeve 130 where it is retained in position between flange 133 and a second flange extending from a shaft slidably and concentrically disposed within casing sleeve 130. In the preferred embodiment, the second flange is pin spring washer 40, which is retained at the head end of pin tension screw 20. Pin tension screw 20 has a threaded, distal end 25. (Note that the threads are visible only in the cross-sections shown in FIGS. 2, 3 and 10.) The head end is larger in diameter than center opening 45 in pin spring washer 40 so that the washer is securely retained on the screw. Pin tension screw 20 is of sufficient length to extend through pin casing base 135 and bumper washer 160, allowing the threaded end 25 to screw into threaded hole 157 in latch pin base 155. As pin tension screw 20 is screwed into latch pin base 155, the distance between latch pin base 155 and spring washer 40 is reduced, applying compressive force to latch pin spring 50. Tightening or loosening the pin tension screw adjusts the compressive force required to move the latch pin 150 during automatic disconnection.

Figure 4:
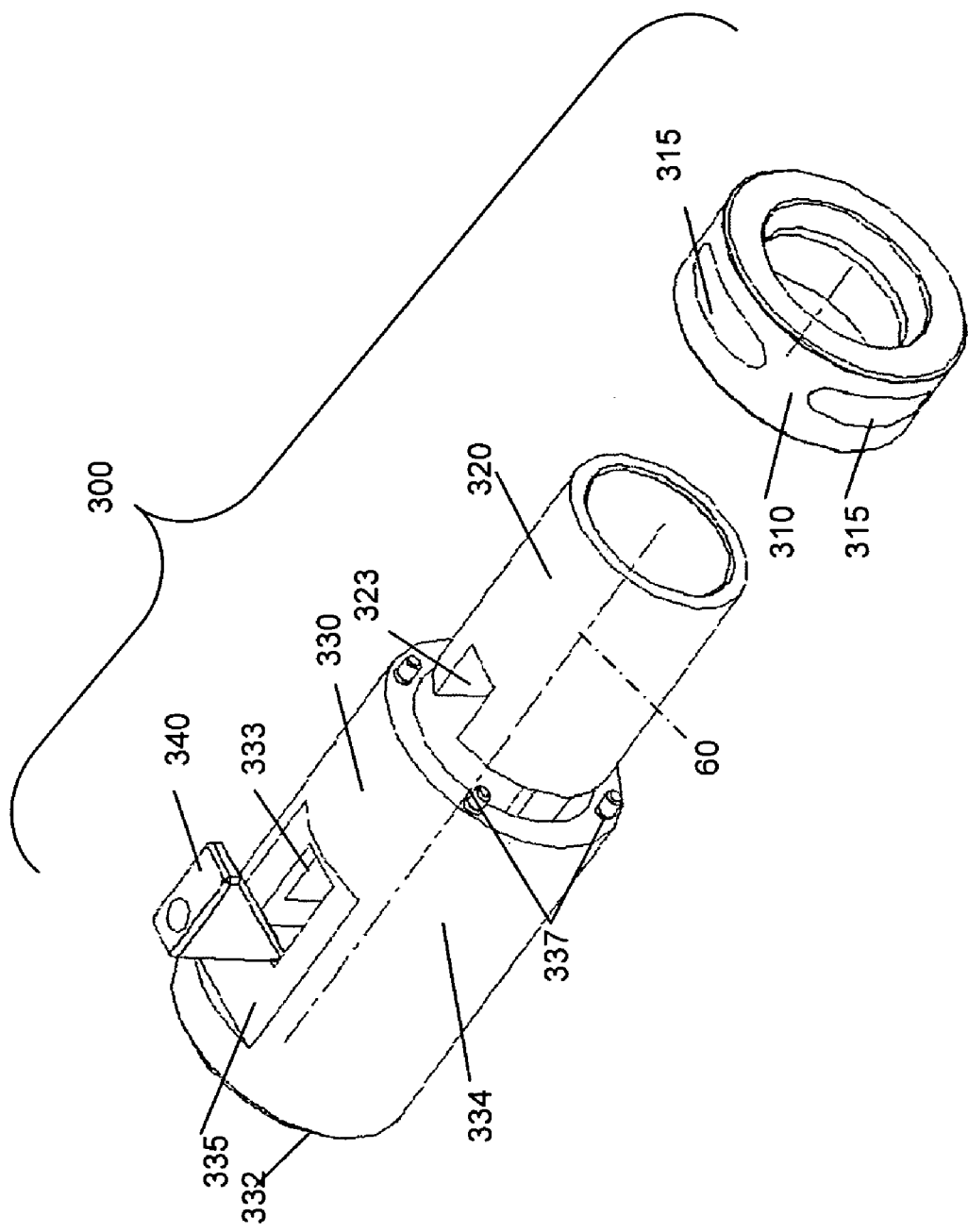
FIG. 4 is an exploded perspective view of the release half of the latch assembly.
Figure 5:
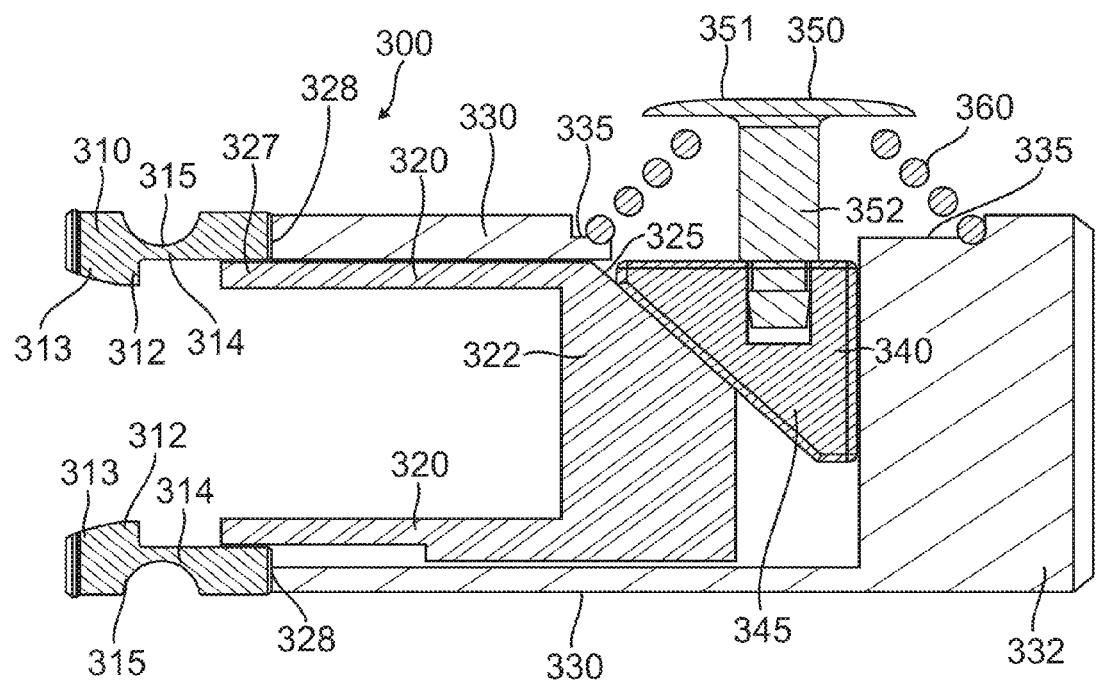
FIG. 5 is a cross sectional view of the release half.
Figure 6:
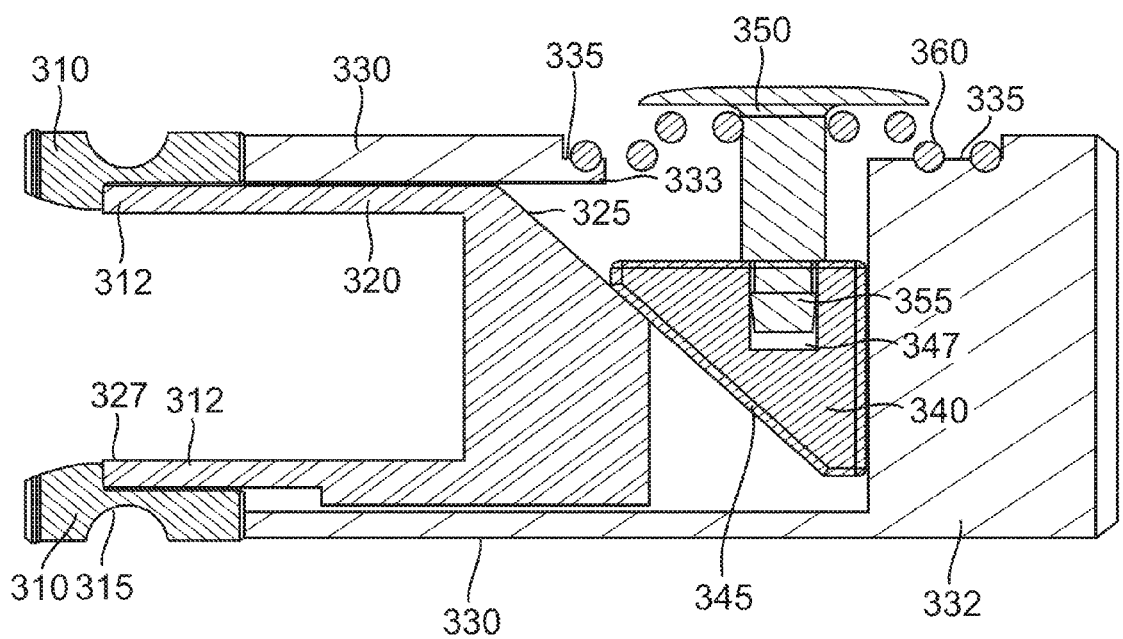
FIG. 6 is a cross sectional view of the release half in the disconnect position.

As shown in FIGS. 4-6, release half 300 is an assembly comprising release catch 310, release slide 320, release housing 330, and a release trigger which, in the preferred embodiment comprises release wedge 340, push button 350, and push button spring 360.

Release housing 330 has a base portion 332 and a hollow cylindrical portion 334. Recess 335 is formed in the outer surface of housing 330 in its upper portion near base portion 332 for retaining push button spring 360. An opening 333 is formed through the wall of housing 330 within recess 335 for retaining release wedge 340. Release housing 330 has an internal radius for slidably receiving release slide 320. Alignment/attachment pins 337 extend in an axial direction from the edge of hollow portion 334 for attachment of release catch 310.

Release slide 320 is cylindrical with a proximal end, a distal end, an upper portion, and a lower portion. The proximal end is generally solid, forming release slide base 322. Angled slot 323 is formed in the upper portion of release slide base 322 with the taper running inward toward the proximal end. The angle and width of slot 323 generally matches the angle and width of release wedge 340 so that release wedge 340 is partially slidably retained within the slot, with at least a portion of the wedge contact surface 345 in contact with the contact slide surface 325. The inner diameter of the distal end defines contact radius 327, which interacts with latch release surface 158 of the pin half 10. The thickness of the distal end of slide release 320 is equal to or greater than the height of catch surface 312. The outer diameter of release slide 320 is smaller than the inner diameter of release housing 330 so that when release slide 320 is inserted into release housing 330, it slides freely and remains floating until force is applied by release wedge 340.

Release wedge 340 extends through opening 333 and into angled slot 323. Threaded bore 347 is formed in the upper surface of release wedge 340 for attaching an activating trigger.

In the preferred embodiment, push button 350 is generally shaped in a "T" cross section with a head 351 and shaft 352. Shaft 352, which is threaded at its distal end 355, is inserted through the upper end of push button spring 360 and screwed into threaded bore 347 of release wedge 340. Spring 360 is a conical compression spring with a smaller diameter at its upper end and a larger diameter at its lower end. The lower end of push button spring 350 is secured by appropriate means within recess 335 of release housing 330. The force of spring 360 biases push button 350 to its uppermost position until sufficient force is applied to depress the button. It will be readily apparent to those of skill in the art that other release trigger mechanisms may be substituted for the described trigger assembly for effecting manual release.

Release catch 310 is generally cylindrical with a proximal end, a distal end, an upper portion, and a lower portion. The diameter of the inner surface of the distal end is beveled outward to form tapered surface 313. A second, larger inner diameter defines the catch surface 312 and the slide surface 314 of release catch 310. The catch surface 312 extends radially, perpendicular to axial centerline 60. Edge 328 of the proximal end has a plurality of bores (not shown) formed for receiving alignment pins 337. Formed in the outer surface of release catch 310 is at least one recess 315 to facilitate attachment of the release half 300 to an external housing, such as that shown in FIG. 8.

Figure 7:
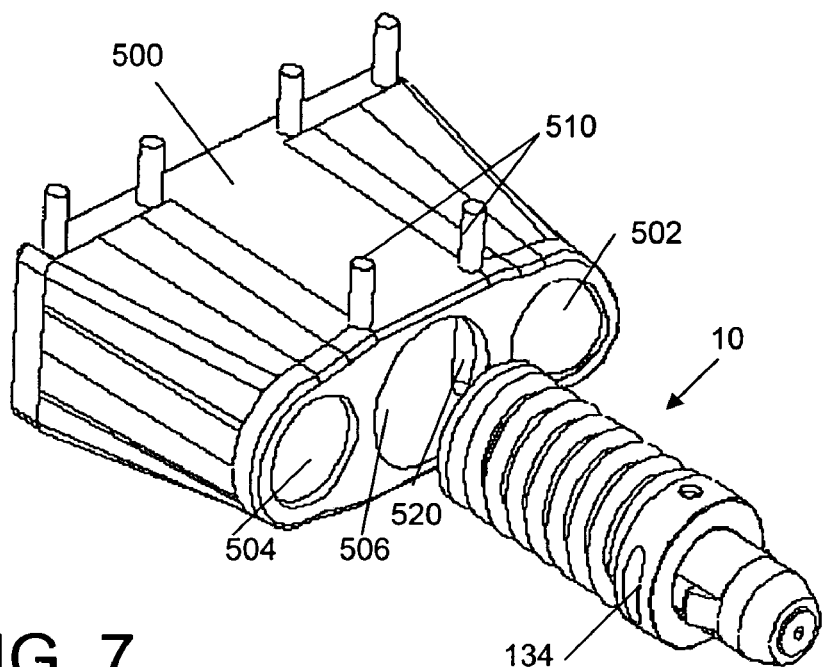
FIG. 7 is a perspective view of the pin half of the latch assembly as applied to a liquid/gas connector.

FIG. 7 illustrates attachment of the pin half 10 to an external housing 500 that is part of a fluid conduit connector with flow passages 502 and 504. Pin half 10 is inserted into opening 506 of external housing 500 until recesses 134 line up with attachment pin holes 520. Attachment pin holes 520 define chords across opening 506 so that when attachment pins 510 are inserted into attachment pin holes 520, they capture recesses 134 and lock pin half 10 securely in place.

Figure 8:
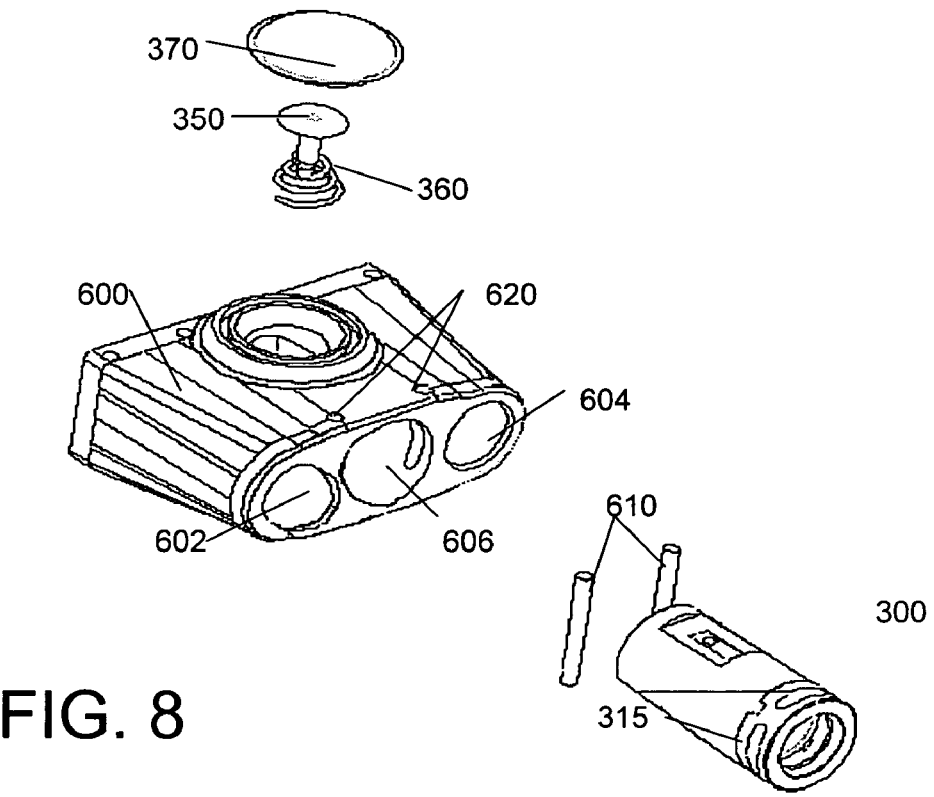
FIG. 8 is a perspective view of the release half of the latch assembly as applied to a liquid/gas connector.

Similarly, FIG. 8 illustrates the incorporation of the release half 300 into an external housing 600 that is part of a fluid conduit connector with flow passages 602 and 604. Release half 300 is inserted into opening 606 of external housing 600 until recess 135 is aligned with attachment pin hole 620. Attachment pin hole 620 define chords across opening 606 so that when attachment pins 610 are inserted into attachment pin holes 620, they capture recesses 315 and lock release half 300 securely in place.

FIG. 8 also illustrates retainer cover 370, a thin resilient material that sits over the top of push button 350 to hold it in place and protect against intrusion of contaminants. Pressing on retainer cover 370 in turn presses on push button 350 for the manual release procedure described below.

Figure 9A:
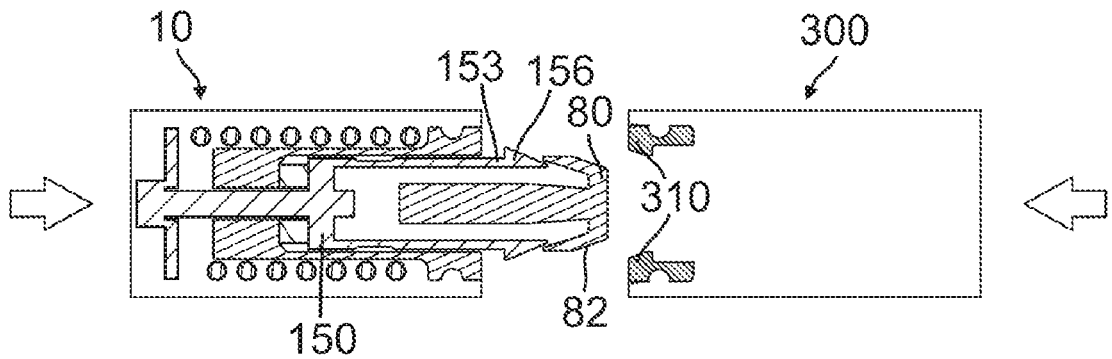
FIGS. 9a-9e are diagrams showing operation of the inventive connector, where
Figure 9B:
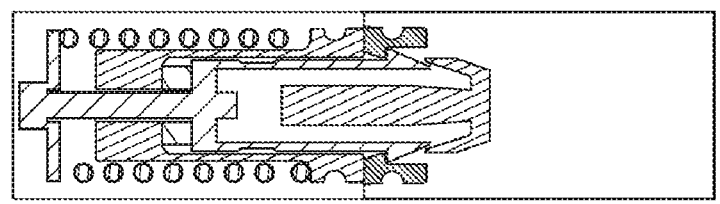
Figure 9C:
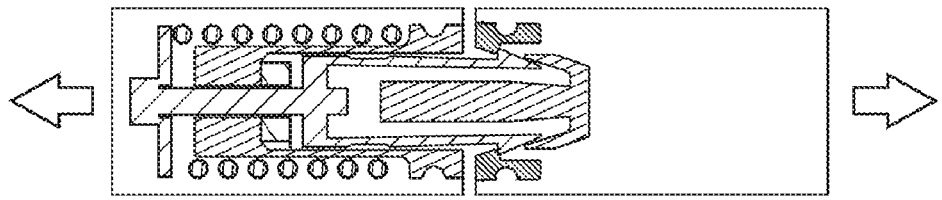
Figure 9D:
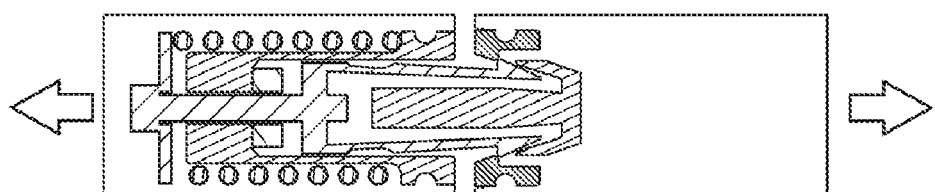
Figure 9E:
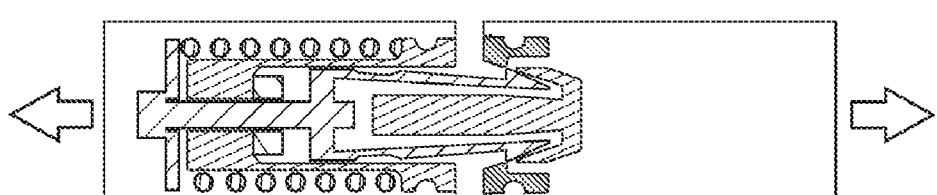

FIGS. 9a-9e are diagrams illustrating the sequence for connection and automatic release of the quick-disconnect latch when an external force is applied to connect and disconnect the two halves, the pin half 10 and the release half 300. FIG. 9a illustrates the pin half 10 and the release half 300 pre-connection, aligned in preparation to join the two latch halves. As the two latch halves move toward each other, tapered surface 313 contacts latch release surface 158 of latch pin dog 156 and as the pin half 10 and release half 300 are brought closer together, the latch pin arm 153 is forced radially inward toward the axial centerline. When the tapered surface 313 of the release catch 310 passes the tip of the latch pin dogs 156, the latch pin dogs 156 spring outward, away from the axial centerline, where the latch surface 159 slides against the catch surface 312, fully engaging the release catch 310 to the latch pin dog 156, thus connecting the pin half 10 to the release half 300 as illustrated in FIG. 9b. FIGS. 9c and 9d illustrate the automatic release of the quick-disconnect latch. An outward force, the pulling of the two halves apart, results in the release catch 310 forcing the latch pin 150 to move along the axial centerline toward and into the nose pin casing 80. The tapered release surface 82 forces the latch pin dogs 156 to move inward toward the axial centerline until the latch pin dogs 156 fully disengage the catch as illustrated in FIG. 9e.

Figure 10:
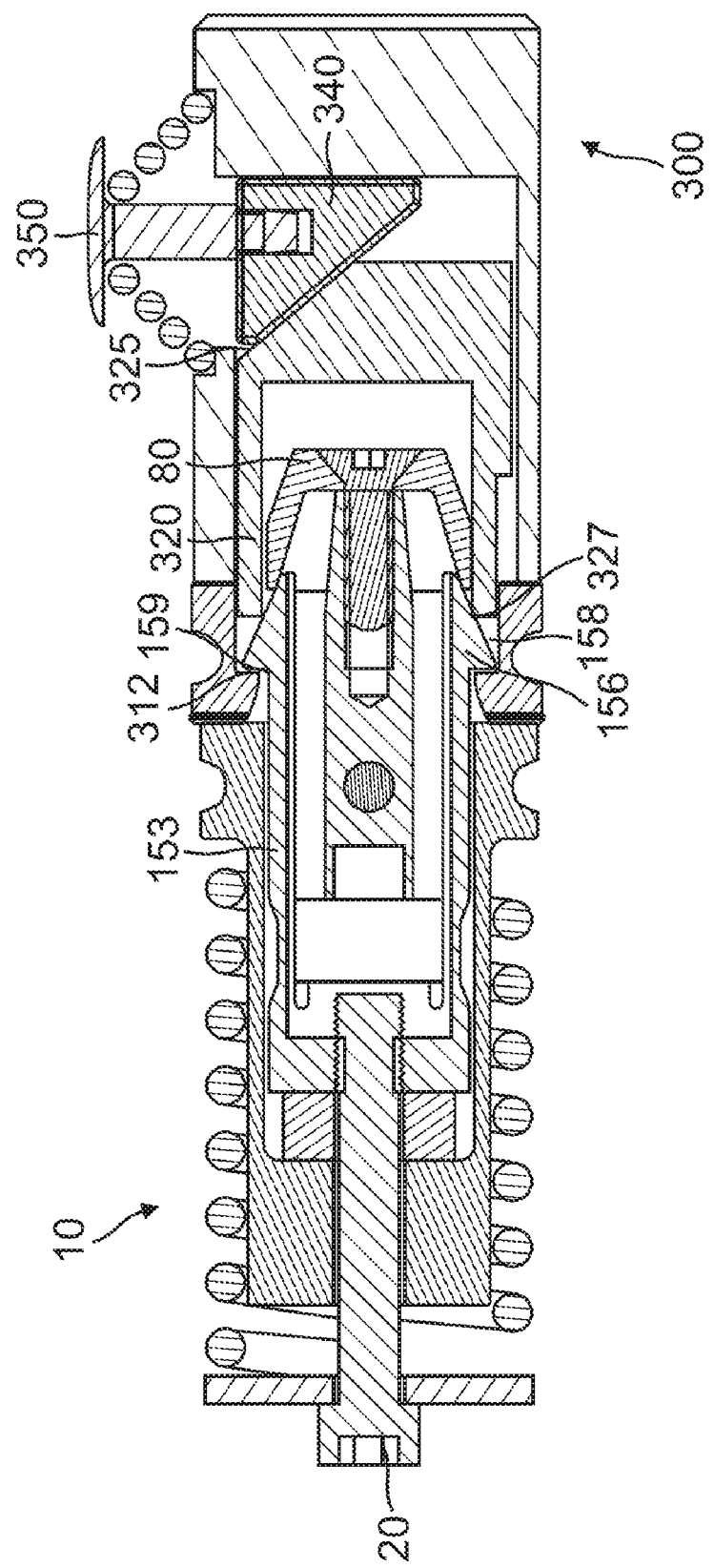
FIG. 10 is a cross sectional view of the pin and release halves of the latch as connected.

The manual release operation of the quick-disconnect latch can be understood with reference to FIG. 10. When connected, nose pin casing 80 is disposed within the interior of release slide 320 and spring 50 is in its fully extended condition (as determined by adjustment of pin tension screw 20.) Contact radius 327 is in contact with latch release surface 158, which pushes release slide 320 axially inward toward release housing base 332. As a downward force is applied to depress push button 350, release wedge 340 cams against contact slide surface 325 of release slide 320 to convert the radial force into an axial force causing release slide 320 to move away from base 332 and toward pin half 10. Contact radius 327 cams against latch release surface 158, converting the axial force into a radial force that drives latch pin arms 153 inward. As latch pin arms 153 continue to move toward the axial centerline, latch surfaces 159 of latch pin dogs becomes disengaged from catch surface 312 so that the two surfaces are no longer in contact with each other. At this point, the pin half 10 may be separated from the release half 300. Once the push button is released, the latch components return to their normal positions.

The various components of the quick-release latch of the present invention may be formed from metal or plastic using conventional injection molding techniques or by precision machining, such as CNC machining, or by other methods known in the art.

While a preferred embodiment of this invention has been described above, these descriptions are given for purposes of illustration and explanation only. Variations, changes, modifications and departures from the systems and methods disclosed above may be adopted without departure from the spirit and scope of this invention.

What is claimed is:

1. A quick-disconnect latch for a fluid conduit connector, the latch comprising:
   a pin half comprising:
      a casing sleeve having a sleeve base and a first spring flange;
      a latch pin slidably disposed at least partially within the casing sleeve and having a latch pin base and at least two latch arms extending from the base, each latch arm having a latch pin dog extending radially away from an axial centerline;
      a bias spring disposed around the casing sleeve, the spring having a proximal end and a distal end, wherein the distal end abuts the first spring flange to bias the latch pin toward the sleeve base;
      a screw extending axially through the sleeve base, the screw having a head end for retaining a second spring flange and a threaded end for mating with a threaded bore formed in the latch pin base, wherein the second spring flange abuts the proximal end of the spring;
      a pin casing assembly comprising a nose casing having a tapered cavity formed therein and a cylindrical base with a distal extension extending into the tapered cavity, the cylindrical base and distal extension each having channels formed therein for slidably receiving the at least two latch arms, wherein the at least two latch arms extend at least partially into the tapered cavity, and wherein the pin casing assembly is attached to the casing sleeve so that the latch pin is adapted to slide axially relative to the pin casing assembly; and
   a release half for mating with the pin half, the release half comprising a release housing with a release catch for cooperating with the latch pin dogs to engage the release half and the pin half;
   wherein adjustment of the screw controls compression of the bias spring to adjust bias force applied by the spring to establish a pre-determined axial break force and wherein the pin half is separable from the release half by applying axially separating forces that exceed the predetermined axial break force.

2. The quick-disconnect latch of claim 1, wherein the release half further comprises a manual release assembly comprising:
a release trigger disposed within the release housing and comprising a first camming surface;
a release slide slidably disposed within the release housing having a second camming surface for interacting with the first camming surface, wherein activation of the release trigger causes the release slide to move toward the pin half, forcing the latch arms radially inward until the latch pin dogs lose contact with the release catch, releasing the pin half from the release half.

3. The quick-disconnect latch of claim 2, wherein the release trigger comprises a spring-biased push button extending through a wall of the release housing and a wedge disposed within the release housing.

4. The quick-disconnect latch of claim 1, further comprising a resilient washer disposed between the latch pin base and the sleeve base.

5. The quick-disconnect latch of claim 1, wherein the at least two latch arms are biased radially outward.

6. The quick-disconnect latch of claim 1, wherein spring flange has a plurality of grooves formed in its outer surface for cooperating with fasteners for attaching the pin half within a fluid conduit connector housing.

7. The quick-disconnect latch of claim 1, wherein the release catch has an outer surface with a plurality of grooves formed therein for cooperating with fasteners for attaching the release half within a fluid conduit connector housing.

8. A quick-disconnect latch for use in a liquid conduit connector, the latch comprising a pin half and a release half, wherein the pin half comprises:
a casing sleeve having a sleeve base and a first flange;
a screw extending axially through the sleeve base, the screw having a head end with a second flange;
a latch pin slidably disposed at least partially within the casing sleeve and having a latch pin base with a threaded bore for receiving the threaded end of the screw and a plurality of latch arms extending from the base, each latch arm having a latch pin dog extending radially away from an axial centerline;
a bias spring disposed around the casing sleeve and retained between the first flange and the second flange for biasing the latch pin toward the sleeve base;
a pin casing assembly attached to the casing sleeve, the pin casing assembly comprising a nose casing having a tapered cavity formed therein and a cylindrical base adapted to slidably fit between the latch arms so that the at least two latch arms extend at least partially into the tapered cavity, wherein the latch pin is adapted to slide axially relative to the pin casing assembly;
wherein adjustment of the screw controls compression of the bias spring to adjust bias force applied by the spring to establish a pre-determined axial break force and wherein the pin half is separable from the release half by applying axially separating forces that exceed the pre-determined axial break force; and wherein the release half comprises:
a release housing with a release catch for cooperating with the latch pin dogs;
a release trigger disposed within the release housing and comprising a first camming surface; and
a release slide slidably disposed within the release housing having a second camming surface for interacting with the first camming surface, wherein activation of the release trigger causes the release slide to move toward the pin half, forcing the latch arms radially inward until the latch pin dogs lose contact with the release catch, releasing the pin half from the release half.

9. The quick-disconnect latch of claim 8, wherein the release trigger comprises a spring-biased push button extending through a wall of the release housing and a wedge disposed within the release housing.

10. The quick-disconnect latch of claim 8, further comprising a resilient washer disposed between the latch pin base and the sleeve base.

11. The quick-disconnect latch of claim 8, wherein the at least two latch arms are biased radially outward.

12. The quick-disconnect latch of claim 8, wherein first flange has a plurality of grooves formed in its outer surface for cooperating with fasteners for attaching the pin half within a fluid conduit connector housing.

13. The quick-disconnect latch of claim 1, wherein the release catch has an outer surface with a plurality of grooves formed therein for cooperating with fasteners for attaching the release half within a fluid conduit connector housing.

14. A quick-disconnect latch having a pin half and a release half for use in a liquid conduit connector, the latch comprising:
a latch pin having a plurality of latch arms, each latch arm having a latch pin dog at a distal end for interacting with a release catch in the release half;
a casing sleeve for slidably retaining the latch pin, the casing sleeve having a first flange;
a spring disposed over the casing sleeve with a first spring end abutting the first flange;
an adjustment screw having a second flange and a threaded end mated with the latch pin, wherein a second spring end of the spring abuts the second flange to bias the second flange away from the first flange and the latch pin into the casing sleeve; and
a nose casing having a base portion slidably disposed between the latch arms and attached to a distal end of the casing sleeve, the nose casing having a hollow nose with a tapered cavity for contacting the latch pin dogs to cam the arms inward when a pre-determined separating axial force is applied to one or both of the pin half and the release half so that the latch pin dogs release the release catch;
wherein the pre-determined separating axial force is adjusted by turning the adjustment screw.

15. The quick-disconnect latch of claim 1, wherein the release half further comprises a manual release assembly comprising:
a release trigger disposed within release housing and comprising a first camming surface;
a release slide slidably disposed within the release housing having a second camming surface for interacting with the first camming surface, wherein activation of the release trigger causes the release slide to move toward the pin half, forcing the latch arms radially inward until the latch pin dogs lose contact with the release catch, releasing the pin half from the release half.

16. The quick-disconnect latch of claim 15, wherein the release trigger comprises a spring-biased push button extending through a wall of the release housing and a wedge disposed within the release housing.

17. The quick-disconnect latch of claim 14, further comprising a resilient washer disposed between a base of the latch pin and a base of the casing sleeve.

18. The quick-disconnect latch of claim 14, wherein the latch arms are biased radially outward.

19. The quick-disconnect latch of claim 14, wherein the first flange has a plurality of grooves formed in its outer surface for cooperating with fasteners for attaching the pin half within a fluid conduit connector housing.

20. The quick-disconnect latch of claim 14, wherein the release catch has an outer surface with a plurality of grooves formed therein for cooperating with fasteners for attaching the release half within a fluid conduit connector housing.

* * * * *

UNITED STATES PATENT AND TRADEMARK OFFICE
CERTIFICATE OF CORRECTION

PATENT NO. : 7,585,001 B2 Page 1 of 1
APPLICATION NO. : 11/369290
DATED : September 8, 2009
INVENTOR(S) : Joseph L. Rose and Thomas Van Humbeck It is certified that error appears in the above-identified patent and that said Letters Patent is hereby corrected as shown below:

Title Page, Item (75) Inventor should read:   Joseph L. Rose, Pembroke (CA); Thomas Van Humbeck, Greely (CA)

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,585,001 B2 | Page 1 of 1 |
| APPLICATION NO. | : 11/369290 | |
| DATED | : September 8, 2009 | |
| INVENTOR(S) | : Joseph L. Rose | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 793 days.

Signed and Sealed this

Fourteenth Day of September, 2010

David J. Kappos
*Director of the United States Patent and Trademark Office*